United States Patent
Ebrahimi

(10) Patent No.: US 12,028,960 B2
(45) Date of Patent: Jul. 2, 2024

(54) SYSTEM AND METHOD FOR ALFVENIC RECONNECTING PLASMOID PLASMA ACCELERATION

(71) Applicant: The Trustees of Princeton University, Princeton, NJ (US)

(72) Inventor: Fatima Arezu Ebrahimi, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 450 days.

(21) Appl. No.: 17/488,986

(22) Filed: Sep. 29, 2021

(65) Prior Publication Data

US 2022/0104338 A1    Mar. 31, 2022

Related U.S. Application Data

(60) Provisional application No. 63/085,660, filed on Sep. 30, 2020.

(51) Int. Cl.
*H05H 1/54* (2006.01)
*H01F 6/06* (2006.01)

(52) U.S. Cl.
CPC .............. *H05H 1/54* (2013.01); *H01F 6/06* (2013.01)

(58) Field of Classification Search
CPC .. H05H 1/54; H01F 6/06; H01F 7/202; Y02E 30/00; Y02E 30/10; F03H 1/0081; G21B 1/11; G21D 5/00
See application file for complete search history.

(56) References Cited

U.S. PATENT DOCUMENTS

| | | | |
|---|---|---|---|
| 7,808,353 B1 * | 10/2010 | Eskridge | H01F 5/00 |
| | | | 336/227 |
| 10,201,070 B2 * | 2/2019 | Seward | H01J 37/32055 |

OTHER PUBLICATIONS

Schoenberg et al., Preliminary Investigation of Power Flow and Electrode Phenomena in a Multi-Megawatt Coaxial Plasma Thruster:, NASA Contractor Report 191084, pp. 1-57, Mar. 1993.

(Continued)

*Primary Examiner* — Minh D A
(74) *Attorney, Agent, or Firm* — MEAGHER EMANUEL LAKS GOLDBERG & LIAO LLP

(57) ABSTRACT

According to various embodiments, a system for using magnetic reconnection to accelerate plasma is disclosed. The system includes a pair of electrodes including two concentric rings separated by an electrode gap and held at different electrostatic potential by applying a voltage to generate an inter-electrode electric field. The system further includes a plurality of magnetic coils configured to produce magnetic field lines that connect the pair of electrodes. The system additionally includes a gas injector configured to inject gas into the electrode gap, the injected gas being partially ionized by the inter-electrode electric field to generate a poloidal current that flows along open magnetic field lines across the electrode gap. A total Lorentz force causes oppositely directed magnetic field lines to be expanded around a region of the gas injector to further create an azimuthal current in the form of an axially elongated current sheet that is unstable such that the axially elongated current sheet reconnects and breaks into plasmoids.

27 Claims, 13 Drawing Sheets

(56) References Cited

OTHER PUBLICATIONS

Bathgate et a;. , "A thruster using magnetic reconnection to create a high-speed plasma jet", Eur. Phys. J. Appl. Phys, vol. 84, 20801, 2018.

Cheng, "Application of a Deflagration Plasma Gun as a Space Propulsion Thruster", AIAA Journal, vol. 9, No. 9, pp. 1681-1685, Sep. 1971.

* cited by examiner

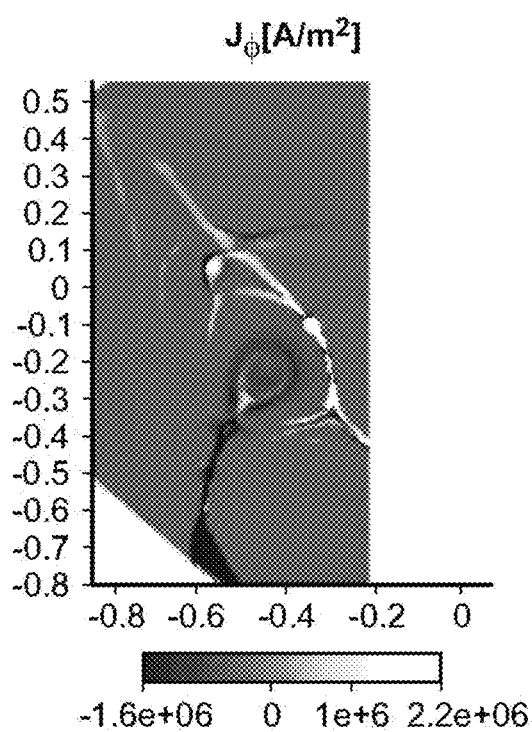 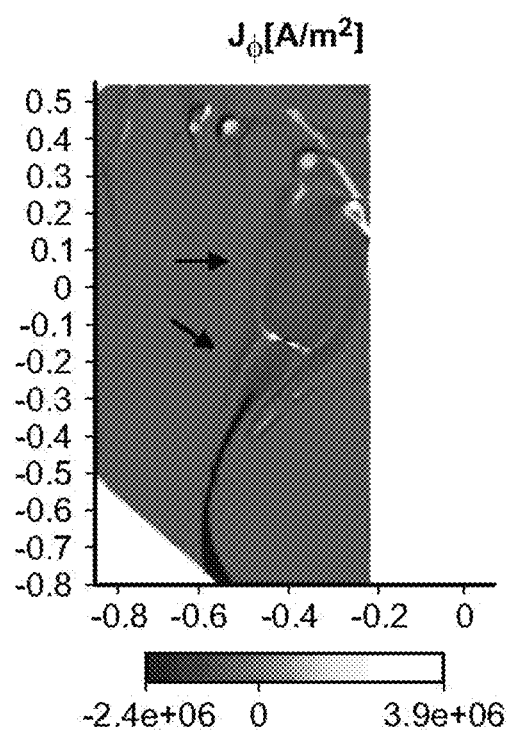
*FIG. 5(d)*  *FIG. 5(e)* ns 63/085,660, filed Sep. 30, 2020, which is herein
SYSTEM AND METHOD FOR ALFVENIC RECONNECTING PLASMOID PLASMA ACCELERATION

CROSS-REFERENCE TO RELATED APPLICATIONS

This application claims priority to provisional applications 63/085,660, filed Sep. 30, 2020, which is herein incorporated by reference in its entirety.

STATEMENT REGARDING FEDERALLY SPONSORED RESEARCH OR DEVELOPMENT

This invention was made with government support under DOE Grant Nos. DE-AC02-09-CH11466 and DE-SC0010565. The government has certain rights in the invention.

FIELD OF THE INVENTION

The present invention relates generally to a system and method for accelerating plasma using a configuration of static electric and magnetic fields to create plasmoids continuously via magnetic reconnection, or a system and method that uses pulsed (programmed) electric field or time-dependent coil currents (to produce magnetic fields) to create plasmoids through magnetic reconnection to accelerate plasma. Applications include but are not limited to producing thrust for a space-propulsion system or creating thermonuclear fusion by injecting fuel isotopes into a reaction chamber.

BACKGROUND OF THE INVENTION

Natural plasma engines such as the sun continuously generate enormous magnetic energy with complex field topology and release this magnetic energy in other forms. In the solar corona region, the linkage and the complexity of field lines, magnetic helicity, is injected through twisting field lines via shear motion of their foot points. This build-up of magnetic helicity is then released through the process of magnetic reconnection, i.e., the rearrangement of magnetic field topology of plasmas, in which magnetic energy is converted to kinetic energy and heat. On the surface of the sun, the process of magnetic helicity injection provides the reconnection sites for oppositely directed fields lines to come together to reconnect and energize.

To be useful for propulsion, the plasma accelerated by magnetic reconnection must detach from the ambient magnetic field so that a net reactive force (thrust) is created. This is the case for any type of reconnection that produces plasmoids. Plasmoids are plasma bodies enveloped by closed magnetic field lines, i.e. they are magnetically detached from the ambient magnetized plasma. In the following the definition will be broadened to also include plasma objects that are not yet fully detached, but that will detach before exiting the thruster channel of a propulsion device.

Existing space-proven plasma thrusters, including the ion thruster and the Hall-effect thruster, electrostatically accelerate ions to exhaust velocities $v_e$ of tens of km/s to produce thrust. However, for space exploration to Mars and beyond, high-thrust electromagnetic propulsion with exhaust velocities of tens to hundreds of km/s is needed.

For efficient propellant and propulsion-power use during space travel, thrusters should have an exhaust velocity similar to the velocity difference $\Delta v$ between the origin and destination celestial bodies. This is quantitatively expressed by the Tsiolkovsky rocket equation, $$\Delta v = v_e \ln(m_0/m_1), \quad (1)$$

where $m_0$ and $m_1$ are the total mass, including propellant, at the origin and destination, respectively. Equation (1) shows that for a given $v_e$ and final mass $m_1$ a linear increase in $\Delta v$ requires an exponential increase in initial mass $m_0$. If the propellant is fully spent at the destination, the ratio $(m_0-m_1)/m_0$ is the propellant mass ratio. For conventional chemical thrusters (rockets), the exhaust velocity is limited by the speed of chemical reactions to about 1-4 km/s (or specific impulse $I_{sp}$ between 100 and 400 seconds, where $I_{sp}=v_e/g_0$, where $g_0=9.8$ m/s$^2$ is the standard gravity). Conventional rockets are therefore efficient only for space missions that can be performed with a $\Delta v$ budget of about 4 km/s, e.g., a mission from low Earth orbit (LEO) to low Moon orbit. Even for a highly optimized mission from LEO to Mars, lasting 3-5 months and with a brief launch window every 2-3 years, a $\Delta v=6$ km/s is needed. With an optimistic assumption of $v_e=4$ km/s, Equation (1) gives a propellant mass ratio of 78%, i.e., on launch from LEO more than three quarters of the mass is propellant. Thus, only Earth's immediate neighbors in this solar system are within reach of conventional rockets.

To surpass the exhaust velocity allowed by limited chemical energy density and reaction rates, electromagnetic propulsion can be used. Existing space-proven plasma thrusters can reach a specific impulse $I_{sp}$ of about a couple of thousands seconds (i.e., $v_e$ of about tens of km/s). High-thrust electromagnetic propulsion with $I_{sp}$ of tens of thousands of seconds is needed to explore the solar system beyond the Moon and Mars, as well as to rendezvous with asteroids, to deflect them if they are on a collision course with Earth, or to capture them for use as a source of water and construction materials to support human presence in space.

SUMMARY OF THE INVENTION

According to various embodiments, a system for using magnetic reconnection to accelerate plasma is disclosed. The system includes a pair of electrodes including two concentric rings separated by an electrode gap and held at different electrostatic potential by applying a voltage to generate an inter-electrode electric field. The system further includes a plurality of magnetic coils configured to produce magnetic field lines that connect the pair of electrodes. The system additionally includes a gas injector configured to inject gas into the electrode gap, the injected gas being partially ionized by the inter-electrode electric field to generate a poloidal current that flows along open magnetic field lines across the electrode gap. A total Lorentz force causes oppositely directed magnetic field lines to be expanded around a region of the gas injector to further create an azimuthal current in the form of an axially elongated current sheet that is unstable such that the axially elongated current sheet reconnects and breaks into plasmoids.

According to various embodiments, a system for using magnetic reconnection to accelerate plasma is disclosed. The system includes a pair of electrodes including two concentric rings separated by an electrode gap and held at different electrostatic potential by applying a voltage to generate an inter-electrode electric field. The system further includes a plurality of magnetic coils configured to produce magnetic field lines that connect the pair of electrodes. The system additionally includes a gas injector configured to inject gas into the electrode gap, the injected gas being partially ionized by the inter-electrode electric field to generate a poloidal current that flows along open magnetic field lines across the electrode gap. The system further includes a reaction chamber in a form of an external toroidal magnetic field. A total Lorentz force causes oppositely directed magnetic field lines to be expanded around a region of the gas injector to further create an azimuthal current in the form of an axially elongated current sheet that is unstable such that the axially elongated current sheet reconnects and breaks into plasmoids, and the gas injected comprises isotopes capable of producing thermonuclear fusion reactions.

According to various embodiments, a method for using magnetic reconnection to accelerate plasma is disclosed. The method includes applying a voltage to a pair of electrodes to generate an inter-electrode electric field, the pair of electrodes including two concentric rings separated by an electrode gap and held at different electrostatic potential. The method further includes producing magnetic field lines that connect the pair of electrodes via a plurality of magnetic coils. The method additionally includes injecting gas into the electrode gap via a gas injector, the injected gas being partially ionized by the inter-electrode electric field to generate a poloidal current that flows along open magnetic field lines across the electrode gap. A total Lorentz force causes oppositely directed magnetic field lines to be expanded around a region of the gas injector to further create an azimuthal current in the form of an axially elongated current sheet that is unstable such that the axially elongated current sheet reconnects and breaks into plasmoids.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 5(d) depicts axisymmetric azimuthal current densities at t=0.046 ms according to an embodiment of the present invention;

FIG. 5(e) depicts axisymmetric azimuthal current densities at t=0.056 ms according to an embodiment of the present invention;

DETAILED DESCRIPTION OF THE INVENTION

Figure 1A:
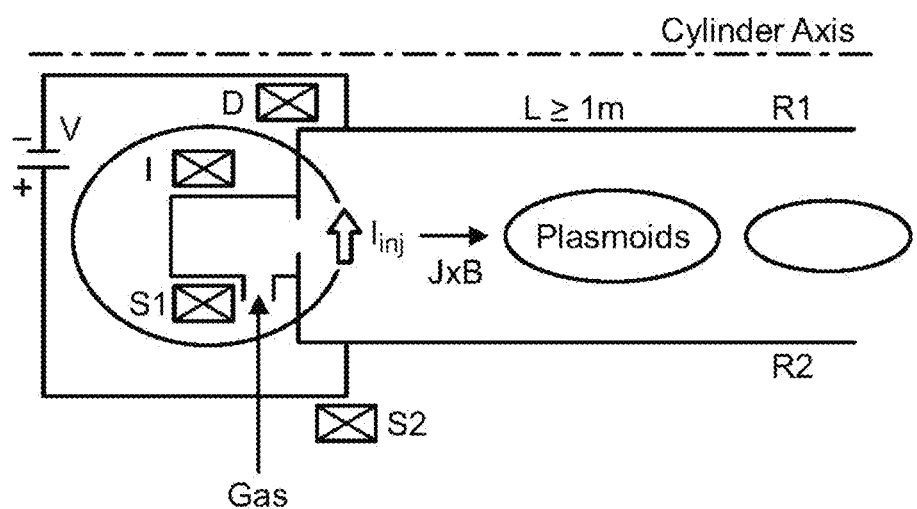
FIG. 1(a) depicts a schematic of a vertical cross section of a reconnecting plasmoid thruster according to an embodiment of the present invention.

Generally disclosed herein are embodiments for generation of thrust for space propulsion. Energetic thrust is generated in the form of plasmoids (confined plasma in closed magnetic loops) when magnetic helicity (linked magnetic field lines) is injected into an annular channel. Using a configuration of static electric and magnetic fields, the embodiments utilize a current-sheet instability to spontaneously and continuously create plasmoids via magnetic reconnection. The generated low-temperature plasma is simulated in a global annular geometry using the extended magnetohydrodynamic model. Because the system-size plasmoid is an Alfvenic outflow from the reconnection site, its thrust is proportional to the square of the magnetic field strength and does not ideally depend on the mass of the ion species of the plasma. Exhaust velocities in the range of 20 to 500 km/s, controllable by the coil currents, are observed in the simulations.

In the embodiments of the thruster approach disclosed herein, the magnetic reconnection sites are also generated via helicity injection, but by driving current along open field lines rather than twisting them via shear motion. This approach is based on the combination of two key physical effects: magnetic helicity injection and axisymmetric magnetic reconnection. Significant thrust is generated in the form of plasmoids when helicity is injected into a cylindrical vessel to induce magnetic reconnection. Embodiments of this approach, capable of reaching high and variable exhaust velocities could complement existing configurations for space missions to Mars and beyond.

A unique feature of the embodiments of the plasmoid thruster introduced herein is its high and variable $I_{sp}$, in the range 1,000 to 50,000 seconds, which would be a key advantage for space missions with a large $\Delta v$, i.e., to Mars and beyond. Here, it is shown that these high specific impulses could be achieved through continuous production of plasmoids to accelerate ions via a magnetic reconnection process.

Magnetic reconnection, which is ubiquitous in natural plasmas, energizes many astrophysical settings throughout the solar system including corona (solar flares), solar wind, planetary interiors, and magnetospheres, as well as throughout the universe, such as flares from accretion disks around supermassive black holes. Magnetic reconnection causes particle acceleration to high energies, heating, energy and momentum transport, and self-organization. Embodiments of the plasma thruster disclosed herein uses an innovative magnetic configuration to inject magnetic helicity using two annular electrodes biased by a voltage source, thereby inducing spontaneous reconnection via formation of a current sheet, which continuously breaks and generates plasmoids. Rather than a Lorentz force generated by a self-induced magnetic field accelerating plasmas to large velocities, embodiments of the disclosed approach use magnetic reconnection to accelerate the plasmas. Unlike existing plasma accelerators, the thrust is generated from the acceleration of bulk fluid due to continuous formation of reconnecting plasmoids in the magnetohydrodynamic (MHD) regime. Neither external pulsing nor rotating fields are required here for acceleration through reconnection.

Axisymmetric reconnecting plasmoids are secondary magnetic islands, which are formed due to plasmoid instability. At high Lundquist number, the elongated current sheet becomes magnetohydrodynamic (MHD) unstable due to the plasmoid instability, an example of spontaneous reconnection. The transition to plasmoid instability was shown to occur when the local Lundquist number $S=LV_A/\eta_1$ ($V_A$ is the Alfven velocity based on the poloidal reconnecting magnetic field, L is the current sheet length, and $\eta$ is the magnetic diffusivity) exceeds a critical value (typically a few thousand). Embodiments of the disclosed thruster approach is based on the formation of this elongated current sheet for triggering fast reconnection and plasmoid formation. Effects beyond MHD may also contribute to fast reconnection as the current sheet width ($\delta_{sp}$) becomes smaller than the two-fluid or kinetic scales. However, for thruster application system-size MHD plasmoid formation (with radius ranging from a few to tens of centimeters) is desired, where kinetic effects become subdominant for low-temperature plasma (in the range of a few eV to a couple of tens of eV). Here, the MHD plasmoid mediated reconnection occurs at high Lundquist number (about 104 and above), which is achieved at high magnetic field rather than low magnetic diffusivity (or high temperature). To form a single or multiple X-point reconnection site, oppositely directed biased magnetic field (in the range of 20-1000 G) is injected through a narrow gap in an annular device. It is found that the plasmoid structures demonstrated in resistive (or extended) MHD simulations produce high exhaust velocity and thrust that scale favorably with applied magnetic field. It will be shown that the fluid-like magnetic plasmoid loops continuously depart the magnetic configuration about every 10 μs with Alfvenic velocities in the range of 20 to 500 km/s, and the thrust does not ideally depend on the mass of the ion species of the plasma.

Schematics of the Thruster

Figure 1B:
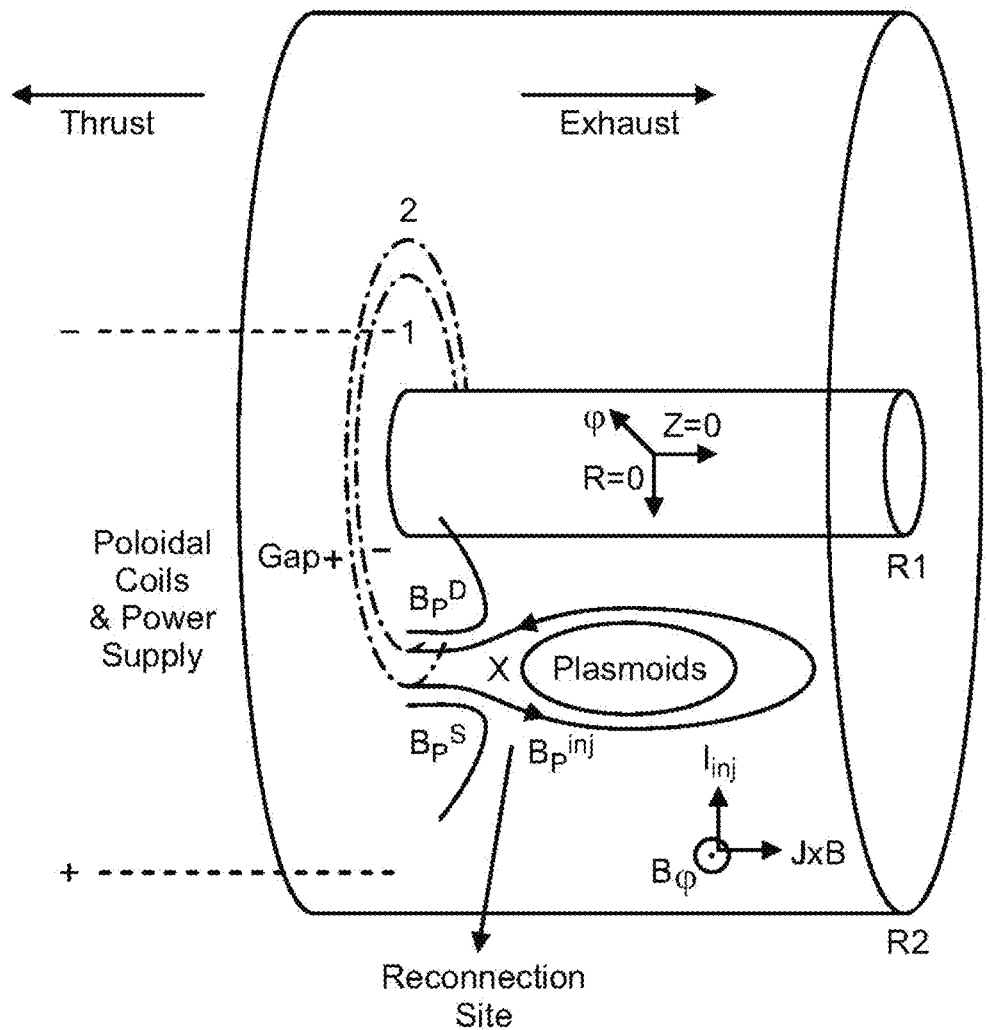
FIG. 1(b) depicts a schematic of the entire domain of the reconnecting plasmoid thruster according to an embodiment of the present invention.

FIGS. 1(a)-(b) show the main parts of the reconnecting plasmoid thruster in an annular configuration. Magnetic helicity injection starts with an initial injector poloidal field ($B_P^{inj}$, with radial, R, and vertical, Z, components), connecting the inner and outer biased plates in the injector region. Gas is injected and partially ionized by applying an injector voltage $V_{inj}$ of a few hundred volts between the inner and outer plates (indicated by numbers 1 and 2), which also drives a current $I_{inj}$ along the open magnetic field lines. Plasma and open field lines expand into the vessel when the Lorentz force $J_{pol} \times B_\phi$ exceeds the field line tension of the injector poloidal field. The azimuthal ($\phi$) field shown here, $B_\phi$, is generated through injector current ($I_{inj}$) alone (by applying $V_{inj}$) or can be provided externally. Plasma formation through electron impact ionization is used herein.

At this stage, the plasmoid-mediated reconnection for generating thrust is introduced, i.e., through forming a vertically elongated (along Z) azimuthal current sheet ($J_\phi$), which contributes to the Lorentz force. To continuously form a current sheet at the reconnection site, the detachment and shaping poloidal fields $B_P^D$ and $B_P^S$ (shown in FIG. 1(b) and produced by the D, S1 and S2 coils) are utilized and have an instrumental role for this thruster. These coils can be effectively used to strongly and radially squeeze the injector poloidal field to cause oppositely directed field lines in the Z direction (shown in arrows at the reconnection site) to reconnect. To form this reconnection site, the currents in the detachment and shaping coils are in the opposite direction to the current in the injector coil, and the detachment-coil current is of magnitude equal to or larger than the injector-coil current. As a result, azimuthally symmetric system-sized plasmoid structures are detached and ejected to produce thrust.

The magnetic coils may be made of high temperature super conductor (HTS) or copper, as nonlimiting examples. HTS magnet tapes can provide high magnetic field and are lighter than copper coils, which make them suitable for aerospace application, particularly for this thruster. Current from the magnetic coils can be adjusted via an adjustable current source. The electrodes could made of conducting material such as aluminum or copper, as nonlimiting examples. The electrodes are shown in FIG. 1(b) as two plates (1 and 2) marked with + and −, respectively. The gas injector will also be annular channel opening up to the gap between the electrodes. The gas injector will be made of electrically insulating material, such as a ceramic as a nonlimiting example, to not short circuit the voltage between the electrodes. The structural material of the rest of the thruster could be an aerospace aluminum alloy.

Global Extended MHD Simulations

Time-dependent extended MHD simulations of the thruster are performed using the NIMROD code, which is a community code supported by DOE, and has been extensively used and validated for various helicity injection fusion experiments. Coil currents are modeled that produce the needed injected field for the reconnection site. Simulations are performed for a constant-temperature model (pressure is not evolved in time) with constant-in-time poloidal-field coil currents. The current in the poloidal coils (I, D, S1, S2) are optimized and varied to form a reconnection site and a current sheet. The extended MHD model includes combined Faraday and generalized Ohm's laws and the momentum equation:

$$\rho\left(\frac{\partial V}{\partial t} + V \cdot \nabla V\right) = J \times B - \nabla \cdot \Pi, \quad (2)$$

$$\frac{\partial B}{\partial t} = -\nabla \times \left(-V \times B + \eta J + \frac{1}{ne} J \times B + \frac{m_e}{ne^2} \frac{\partial J}{\partial t}\right), \quad (3)$$

where V is the center-of-mass velocity and $\rho$ is the mass density of a plasma with magnetic field B and current density J. The stress tensor ($\Pi$) is treated as $-\rho v \nabla^2 V$ or $-\rho v W$, where v is the kinematic viscosity and W is the rate of strain tensor. In all simulations, the kinematic viscosity is chosen to give Prandtl number $P_m=\eta/v=2$-7.5. The magnetic diffusivities used in the simulations ($\eta$=8-32 m$^2$ s$^{-1}$) are equivalent to constant low temperatures of $T_e \approx$5-14 eV, according to the Spitzer resistivity relation ($\eta$(m$^2$ s$^{-1}$)=410 $T^{-3/2}$ (eV)). A constant electric field is applied across the narrow injector gap (located between the two injector plates R=0.54-0.57 m, shown in FIG. 2). Perfectly conducting boundary conditions with no slip are used, except at the injector gap, which has a normal E×B flow, where a constant-in-time electric field is applied. A poloidal grid is used with 45×90 sixth-order finite elements in a global (R, Z) geometry and azimuthal mode numbers ($n_\phi$) up to 22 modes. A uniform number density (n) of $4 \times 10^{18}$ m$^{-3}$ for a deuterium or helium plasma is used. Simulations are performed with various coil currents in a straight plasma domain configuration, shown in FIGS. 1(a)-(b), in a thruster channel with inner and outer radii of R1=0.21 m and R2=0.85 m, with the injector plates (1 and 2, shown in FIGS. 1(a)-(b)) located at Z=-0.8 m. In general, the results do not vary with the axial length of the thruster within the range 1-2 m investigated, and with the angle of the lower injector plates with the side walls (90° and 145°). The locations of the coils are adjusted for simulations performed in different domain sizes. In the simulations shown in FIGS. 3(a)-(b) and 4(a)-(d), the injector (I), detachment (D), and shaping field (S1, S2) coils are located at R=0.52, 0.31, 0.76, 1 m and Z=-1, -0.82, -1.05, -0.81 m, respectively. Fields $B_P^D$ and $B_P^S$ and are static and assumed to have penetrated through the bounding surfaces.

Figure 2:
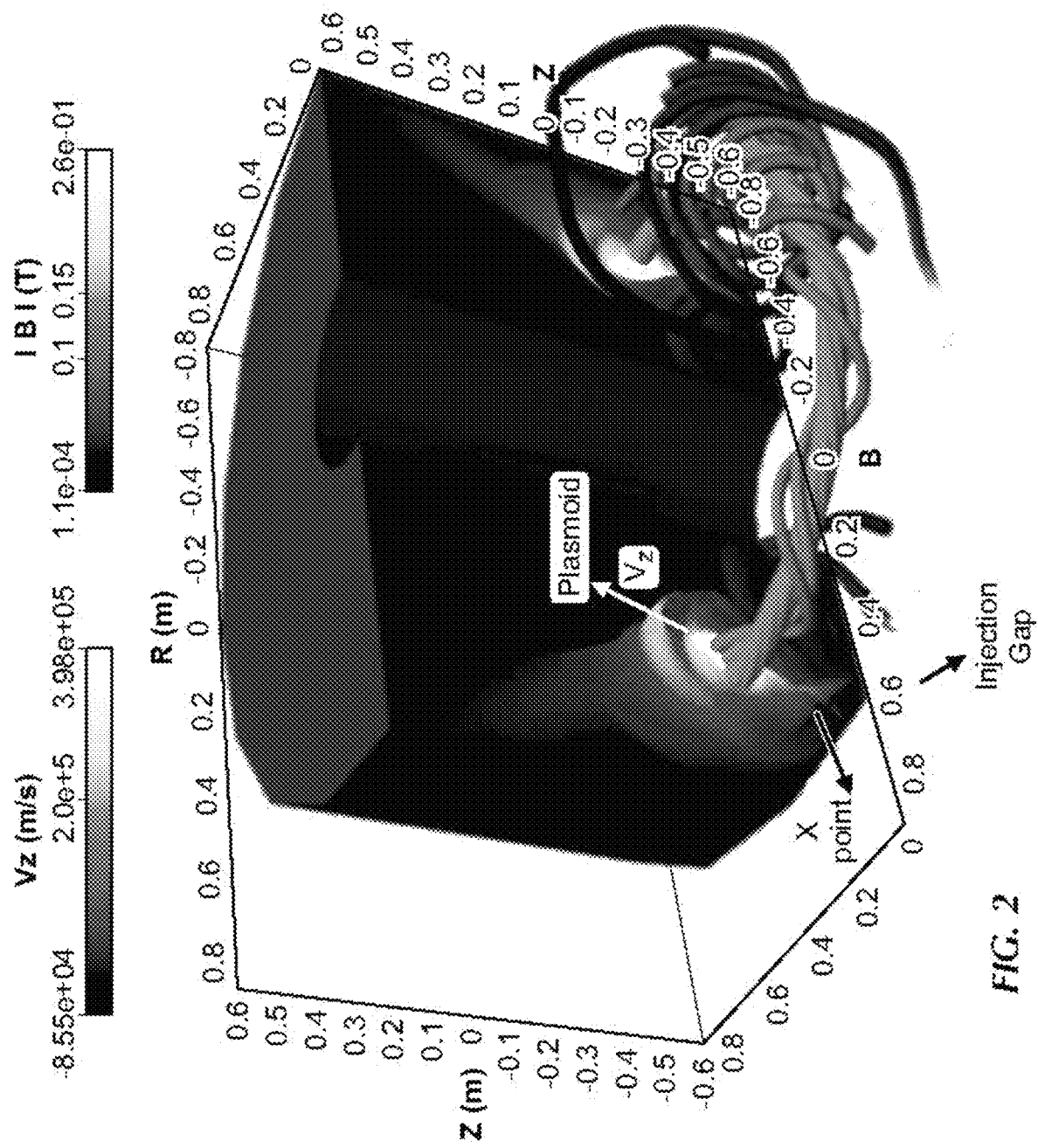
FIG. 2 depicts the formation of momentum-carrying plasmoid during three-dimensional global extended MHD simulations according to an embodiment of the present invention.
Figure 3A:
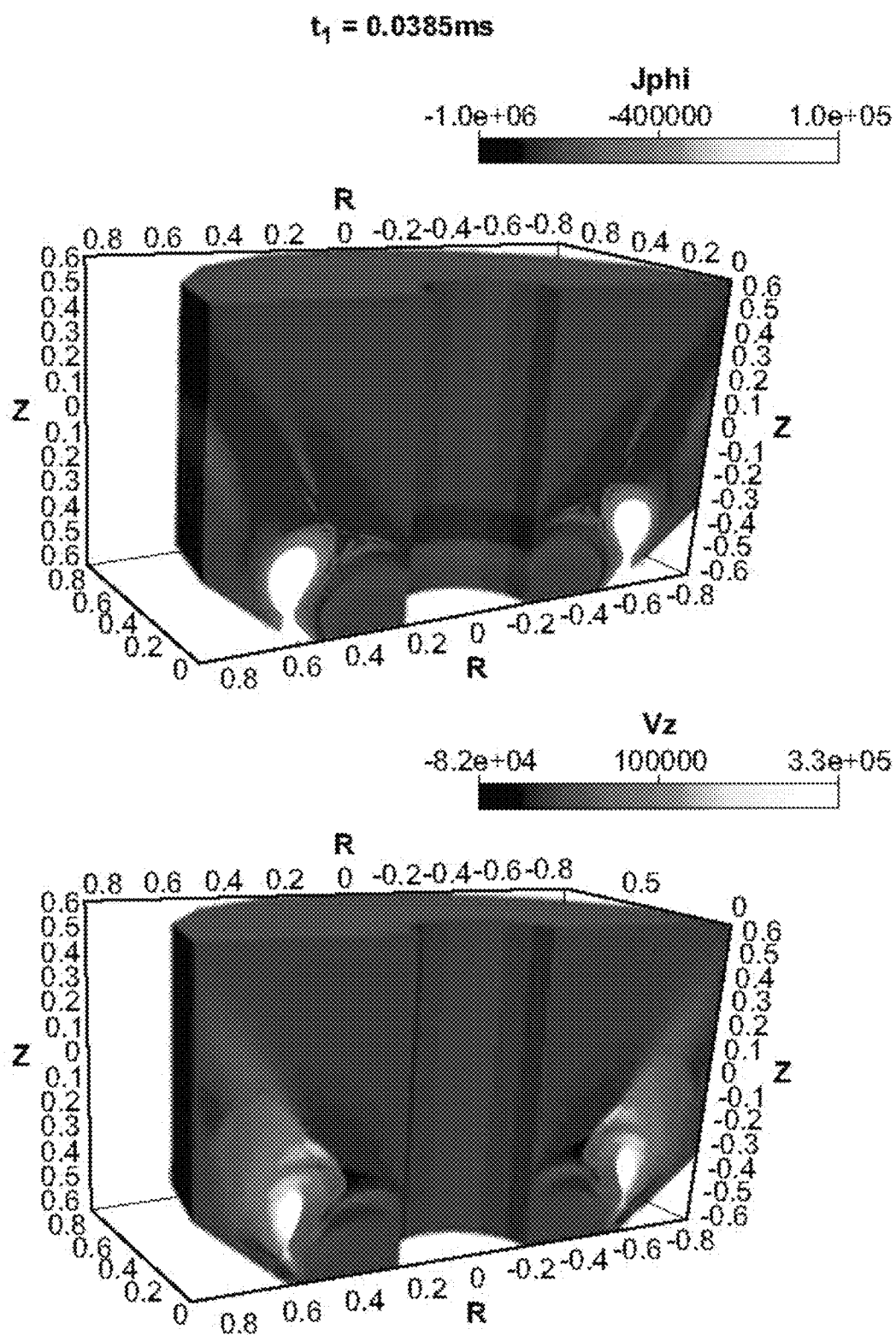
FIG. 3(a) depicts current density (A m$^{-2}$) and axial velocity (m s$^{-1}$) for the two-fluid simulation shown in FIG. 2 at time $t_1$=0.0385 according to an embodiment of the present invention.
Figure 3B:
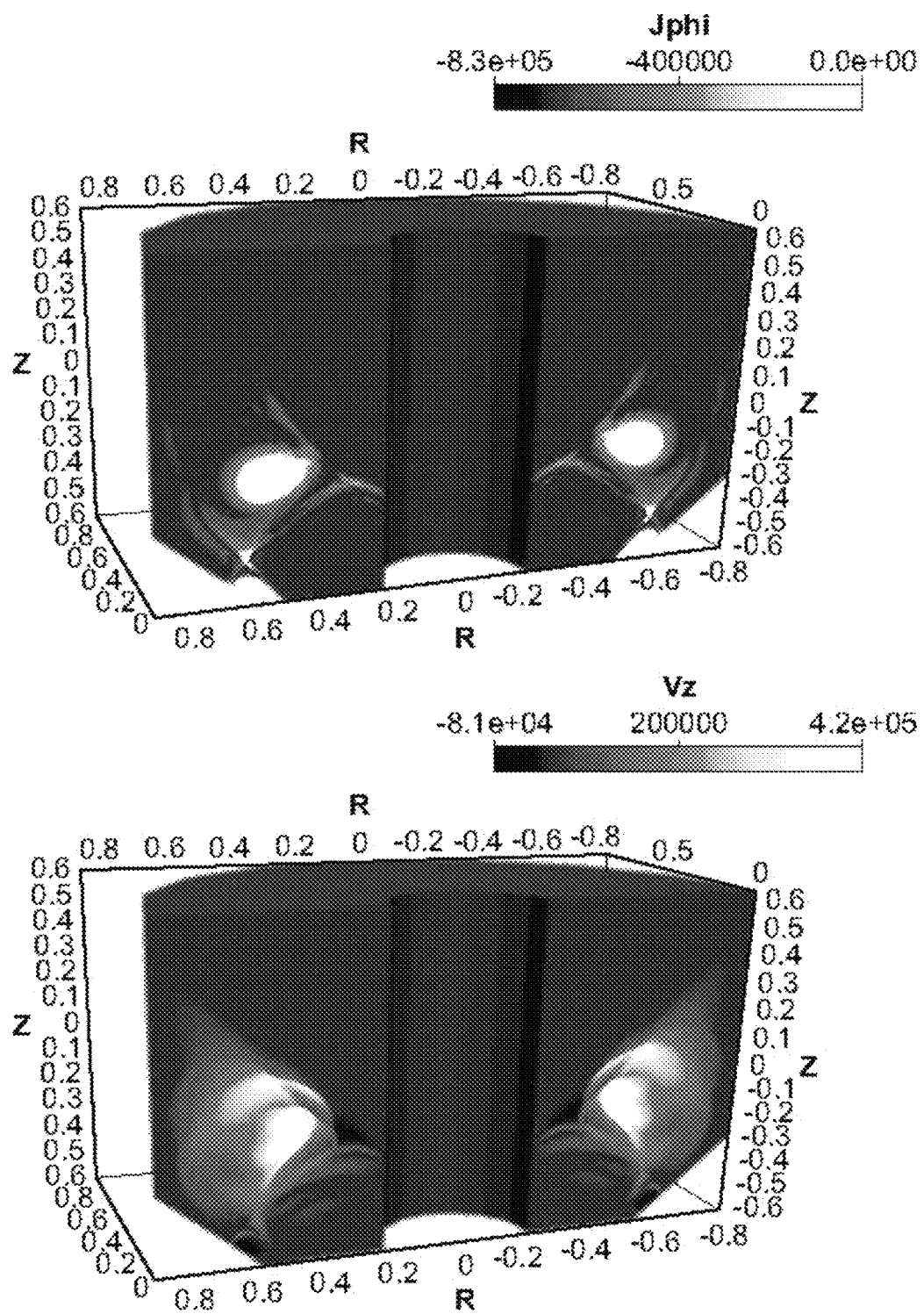
FIG. 3(b) depicts current density (A m$^{-2}$) and axial velocity (m s$^{-1}$) for the two-fluid simulation shown in FIG. 2 at time $t_2$=0.0395 according to an embodiment of the present invention.

Main coils configuration used in the simulations shown in FIGS. 2 and 3(a)-(b) are: (1) Coil I with current of -280 kA, turns at R=0.52, Z=-0.81; (2) Coil D: with current of 360 kA, turns at R=0.31, Z=-0.616; (3) Coil S1: with current of 10 kA, turns at R=0.76, Z=-0.9; and (4) Coil S2: with current of 15 kA, turns at R=1, Z=-0.61.

A cut of the general computational domain of annular geometry is shown in FIG. 2. In this simulation a two-fluid model was used, i.e. using both the Hall term and electron inertia terms in Equation (3) with an increased electron mass ($m_i/m_e$=73). The exhaust vertical velocity of azimuthally symmetric plasmoids reaches about 400 km s$^{-1}$ (FIG. 2). Most of the momentum is along the large plasmoid (and current sheet). The Alfvenic-type outflows obtained here ($V_A$ for this case using $B_z$=0.08 is about 460 km s$^{-1}$) are due to spontaneous reconnection and the plasmoid ejection. In the two-fluid model, fast reconnection is caused by the Hall current, which is a signature of the decoupling of electron and ion motions at scales below the ion skin depth $d_i$ ($d_i=c/\omega_{pi}$, where c is the speed of light and $\omega_{pi}$ is the ion plasma frequency). Here $d_i$ is calculated to be relatively large, about 11 cm. Current density and axial velocity for the two-fluid simulation at two times are also shown in FIGS. 3(a)-(b). The formation of the single X-point during Hall reconnection at $t_1$ and then the subsequent ejection of a large plasmoid at $t_2$ with large exhaust velocity of 420 km s-1 are observed. The two-fluid results in terms of exhaust speed of plasmoids during reconnection are similar to the resistive MHD model (shown below in FIGS. 4(a)-(d) and 5). More detailed results are therefore presented from resistive MHD simulations to focus on the plasmoid-mediated reconnection for embodiments of the invention disclosed herein.

Figure 4A:
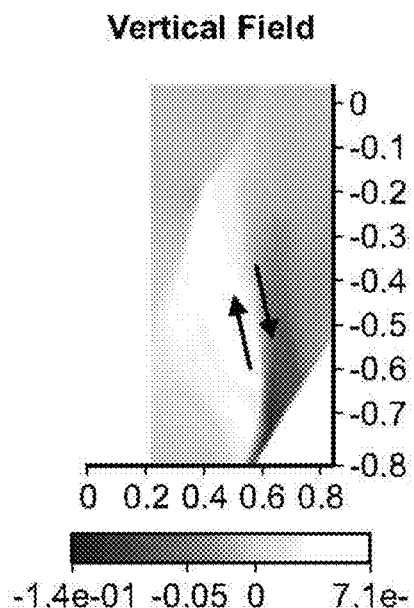
FIG. 4(a) depicts poloidal R-Z cut of injected vertical magnetic field $B_z$ (T) at t=0.044 ms during the helicity injection (arrows show the oppositely directed reconnecting Bz field at the reconnection site) according to an embodiment of the present invention.
Figure 4B:
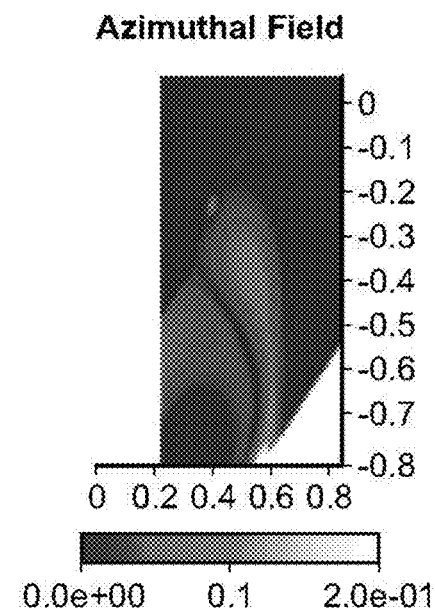
FIG. 4(b) depicts poloidal R-Z cut of generated azimuthal field $B_\phi$(T) at t=0.044 ms during the helicity injection according to an embodiment of the present invention.
Figure 4C:
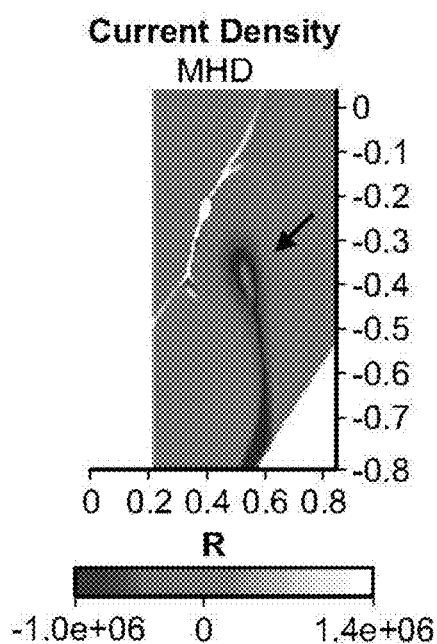
FIG. 4(c) depicts azimuthal current density $J_\phi$(A m-2) with MHD (arrows show reconnecting plasmoids) according to an embodiment of the present invention.
Figure 4D:
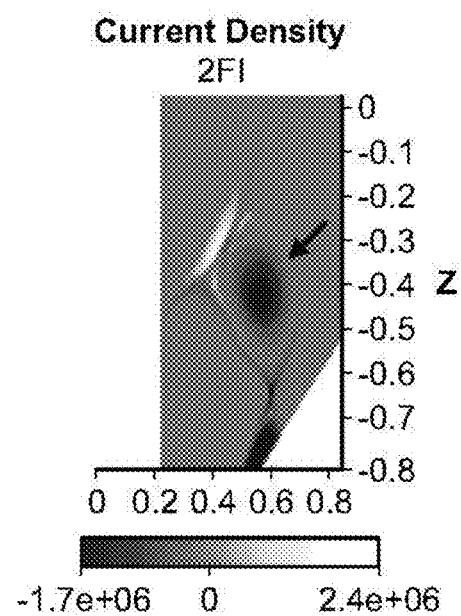
FIG. 4(d) depicts azimuthal current density $J_\phi$(A m-2) with two-fluid model according to an embodiment of the present invention.

For this thruster, the simulation is started with an initial injector poloidal field ($B_P^{inj}$) with a very narrow footprint (where open field lines intersect the inner and outer plates) to form a reconnection site. Poloidal R-Z cuts of the oppositely directed injected reconnecting field ($B_z$), which provides the primary reconnection site, and the azimuthal field, which is intrinsically generated by the poloidal injector current in the injection region, are shown in FIGS. 4(a) and 4(b), respectively. As the injector voltage is applied (by ramping $V_{inj}$ from zero to about 200 V), the generated azimuthal field could reach as high as 2000 G (FIG. 4(b)), which causes the injector poloidal field to start expanding in the thruster channel. As the field is expanded in the domain, the static fields $B_P^D$ and $B_P^S$ radially pinch the injector field around the injector gap to form a primary exhaust reconnecting current sheet, as shown in FIG. 4(c). The plasmoid instability is here triggered at local Lundquist number S~12 000 (based on $B_z$~500 G, L=0.5 m and $\eta$=16 m$^2$ s$^{-1}$). The formation of a plasmoid along the current sheet is seen in FIGS. 4(c)-(d). For comparison, the exhaust current density for the two-fluid simulations (shown in FIG. 2) with single X-point Hall reconnection topology is shown in FIG. 4(d). Two-fluid simulations were also performed at smaller $d_i$ (of about 2 cm at higher density), and then the elongated single-fluid current sheet was recovered.

Figure 5A:
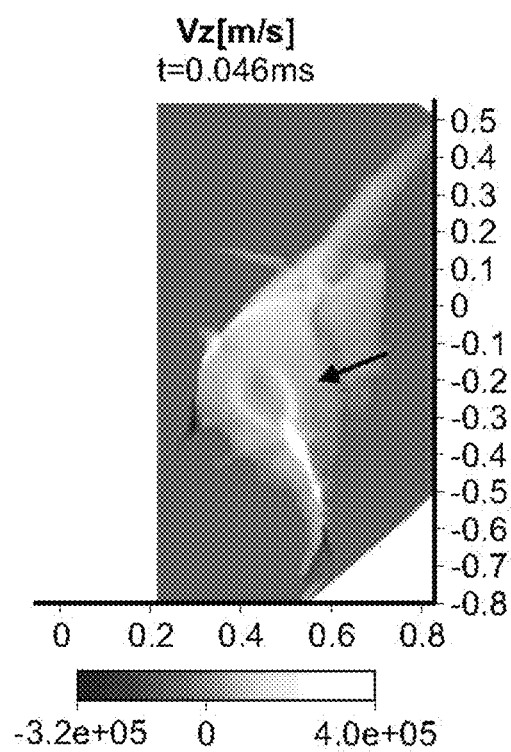
FIG. 5(a) depicts poloidal (R-Z) cuts of vertical flow velocity at t=0.046 ms according to an embodiment of the present invention.
Figure 5B:
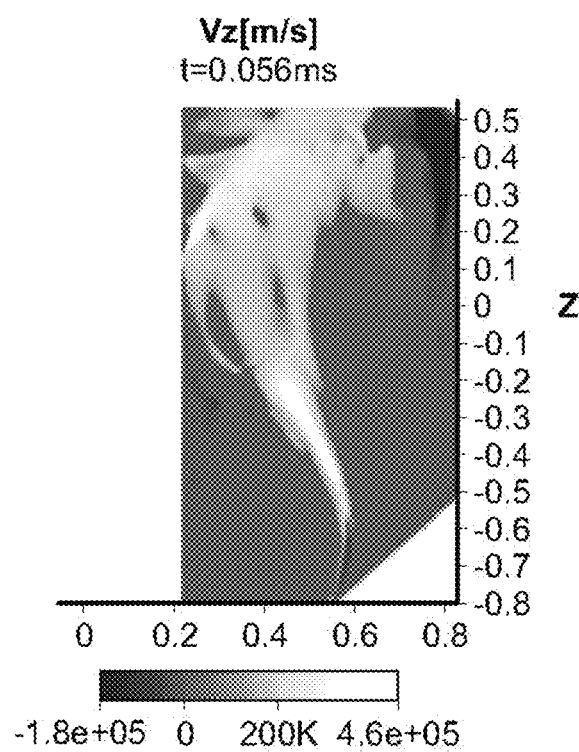
FIG. 5(b) depicts poloidal (R-Z) cuts of vertical flow velocity at t=0.056 ms according to an embodiment of the present invention.
Figure 5C:
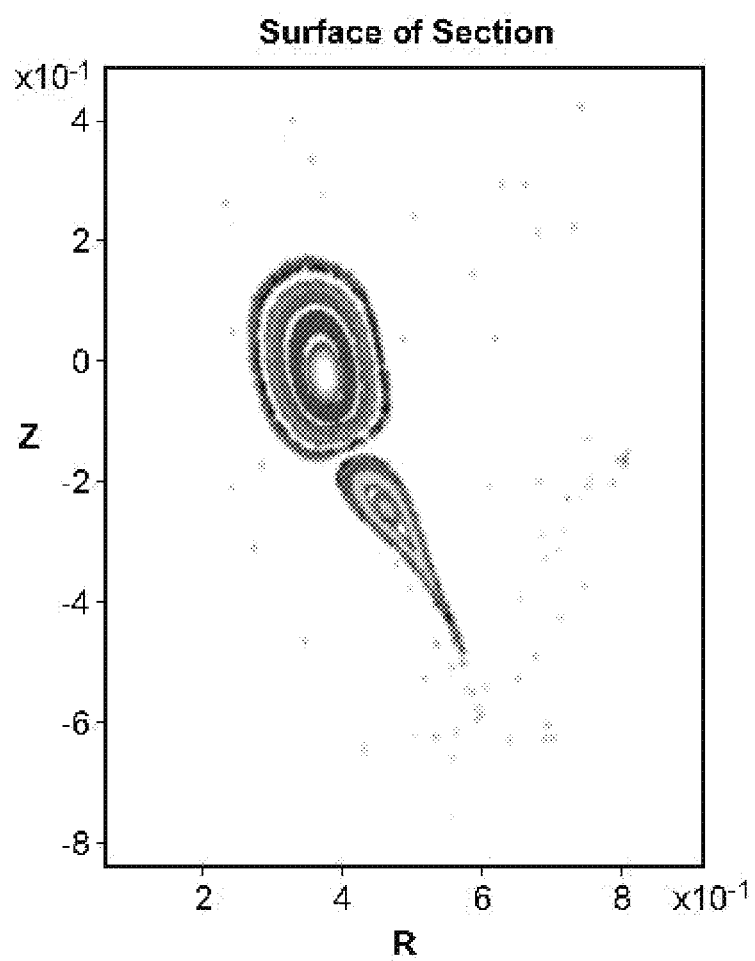
FIG. 5(c) depicts a Poincare plot according to an embodiment of the present invention.

The formation of a large plasmoid with exhaust outflow that reaches as high as $V_z$=400 km s$^{-1}$ around the reconnection region at later time t=0.046 ms is shown in FIGS. 5(a)-(e). The maximum exhaust velocity is mainly along the current sheet and the plasmoid (as can be seen in FIGS. 5(a)-(b)) and exceeds the visco-resistive outflows of the MHD Sweet-Parker (S-P) model, $V_{out}/V_{A(pol)}$=1/$\sqrt{1+Pm}$~170 km s$^{-1}$ (where $V_{A(pol)}=B_{in(z)}/\sqrt{\mu_0 \rho}$). The continuous spontaneous breaking of the current sheet and the subsequent formation of current-carrying magnetically self-confined loops, i.e. plasmoids, occur at later times (FIGS. 5(b)-(c)), as long as the voltage is applied. As seen from the Poincaré plot in FIG. 5(c), two large plasmoids are formed. At this later time, as the first plasmoid is already ejected, the open field lines start to close again and a large-volume closed field line in the form of a second plasmoid is formed and departs the device with a high outflow velocity of about 460 km s-1 (FIG. 5(b)). The maximum outflows are both along the exhaust current sheets (shown in FIGS. 5(d)-(e)) in the form of outflow jets, as well as along the plasmoids. It should be noted that small-scale plasmoids are also formed along a current sheet (seen in FIG. 4(c)) above the primary exhaust current sheet. Although these also contribute to positive large vertical outflows, they are less important, as they are not directly connected to the injector plates. It is important to note that although all the simulations above are three-dimensional (by including 21 non-axisymmetric ($n_\phi \neq 0$) modes), all the structures during nonlinear evolution shown in FIGS. 2-5(e) remain azimuthally symmetric (axisymmetric). In these simulations, the time scale for the cyclic ejection of large-scale axisymmetric plasmoids is around 10 μs (4-5 Alfven transit times). This time scale is much shorter for any non-axisymmetric disturbance to growth to large amplitudes.

Scaling of the Exhaust Velocity with Reconnecting Field

To further examine the variation and the dependence of the exhaust velocity on the injected field ($B_z$), simulations with two different magnetic configurations were performed in which the coil currents are varied. It should be noted that in all the simulations presented above the azimuthal field is intrinsically generated. Here, an external azimuthal guide field of about 7000 G is also used, which would not affect the scaling, as the reconnecting $B_z$ field is only used in FIG. 6. For FIG. 6, the first configuration has three cases shown by triangles, cases 1, 2 with psi=0.065 Wb (case 1 with I, D, S1, S2 coil currents of −140, 240, 5, and 7.5 kA turns, respectively, but in case 2 with 205 kA turns in D coil), case 3 with poloidal flux psi=0.032 Wb where all the coil currents in the case 2 is reduced by 50%. The second configuration (three cases shown by diamonds) has a much higher ratio of shaping flux current, cases 1, 2 with psi=0.1 Wb) (case 1 with the I, D, S1, S2 coil currents of −140, 290, 3, and 15 kA turns, respectively and but in case 2 with 205 kA turns in D), case 3 with psi=0.05 Wb where all the coil currents in the case 2 is reduced by 50%. Maximum exhaust velocity obtained from simulations vs. reconnecting magnetic field shows a favorable scaling. The dashed line shows the theoretical S-P scaling.

Figure 6:
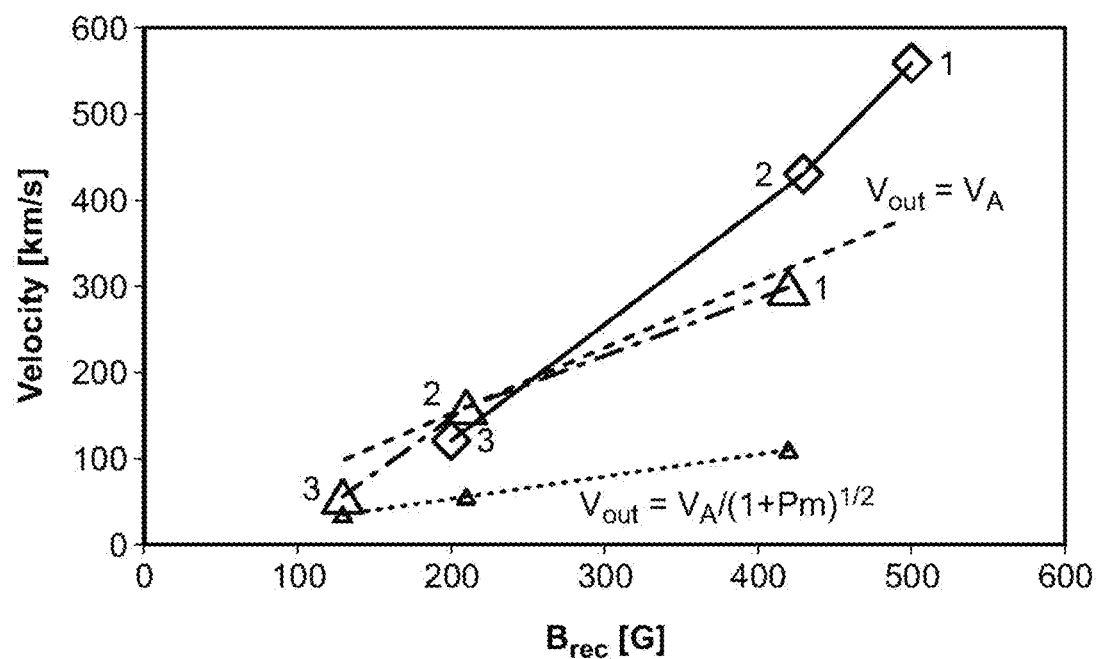
FIG. 6 depicts maximum exhaust velocity obtained from simulations versus reconnecting magnetic field for two magnetic configurations with different ratio of poloidal coil currents according to an embodiment of the present invention.

The first configuration is shown in FIG. 6 in triangles at $B_{rec}$=400 G (case 1), which results in $V_z$=300 km s$^{-1}$. To scan over $B_{rec}$, the detachment coil current is first reduced (which gives $B_z$=200 G, case 2), and then the current in all the coils is reduced by 50% (giving $B_z$=130 G, case 3), and much reduced outflow velocity of about 60 km s$^{-1}$. In the second configuration, a much higher ratio of the two shaping coil currents is used, but with the same injector and detachment coil currents as the first configuration. The dependency of the outflow on $B_{rec}$ for the cases in this configuration is also shown (by diamonds) in FIG. 6. The outflows (maximum flows along the exhaust current sheet) obtained in the simulations are also compared with the slow S-P type reconnection model outflows in a visco-resistive MHD plasma (with Pm=7.5). Using $B_z$ from the simulations, FIG. 6 shows the calculated outflows based on the local S-P model (triangles) versus $B_z$. It is shown that the outflows from MHD simulations do favorably scale with $B_z$, are higher (more than double) compared to the slow S-P velocities and are due to the fast plasmoid-mediated reconnection. It is therefore found that the exhaust velocities in these magnetic configurations are Alfvenic-type reconnecting outflows as they are strongly associated with the strength of $B_{rec}$.

Thrust and the Thrust to Power Ratio

Because the plasmoids are ejected at the Alfven velocity, the expression for the thrust becomes $F=\rho V_A^2 A$, where A is the area of the plasmoid cross-section. Notably, the thrust then does not depend on ρ, and it scales as the magnetic field squared ($B^2$). For example, for plasmoids with radius 10 cm (as in FIG. 3(d)) and reconnecting field of B=800 G, the calculated thrust is about 50 N, considering a duty cycle of about 33% (i.e., the distance between two consecutive plasmoids is twice the plasmoid length). The input power is given by $P_{inj}=I_{inj}V_{inj}$, where $I_{inj}=2\pi r B_\phi/\mu_0$. In general $I_{inj}$ could vary from a few to a few hundred kiloamps. In the simulations, $I_{inj}$ is about 100 kA (equivalent to $B_\phi \sim 500$ G), corresponding to about 10 MW of power. For this unoptimized high-power case (with a thrust of 50-100 N), the ratio of thrust over power is thus about 5-10 mN kW$^{-1}$. Tentatively, the optimal parameter range for this new thruster will be $I_{SP}$ (specific impulse) from 2000 to 50000 s, power from 0.1 to 10 MW and thrust from 1 to 100 N. It would thus occupy a complementary part of parameter space with little overlap with existing thrusters.

In helicity injection start-up plasma experiments (with an injection region similar to here), plasma has been efficiently produced, and both plasma and magnetic fields have been successfully injected via an injector gap. For keeping the operating voltage in a reasonable range of a few hundred volts (for acceptable cathode sputtering and good ionization efficiency), the Paschen curve imposes a minimum gas pressure. For example, for the application here the connection length ($L_c$) is about 10 cm (depending on the vertical and azimuthal magnetic fields), which requires a gas pressure of tens of millitorrs ($L_c$P of about 6 Torr×mm was used here, for an operating point reasonably close to the Paschen minimum). Operating voltages from a few hundred up to a thousand volts have routinely been used for helicity injection experiments, including plasma accelerators as well as plasma start-up for current drive. Significant cathode erosion (from sputtering or arcing) in the injector region has not been reported. For long-pulse operation, the cathode is sometimes coated with graphite or tungsten to minimize sputtering. Once the plasmoid has formed, the simulations show that it stays away from the walls and should therefore not contribute to wall erosion. In the simulations walls provide the necessary boundary conditions in the domain; however, more evolved versions of this thruster might in fact be wall-less.

CONCLUSION

As such, disclosed herein are embodiments for a new approach for the generation of thrust for space propulsion. With a low plasma temperature of only a few eV, the plasmoid objects, which could have diameters as large as several tens of centimeters, are generated in a fluid-like (MHD and two-fluid Hall) regime and move with the center of mass of the plasma. The approach is explored via three-dimensional extended MHD simulations of reconnecting plasmoid formation during helicity injection into an annular channel. Based on the simulations, it was found that there are fundamentally several advantages of this novel thruster, including but not limited to the following. (i) There is a high and variable exhaust velocity as large as 500 km s$^{-1}$ with injected poloidal field of 500-600 G. (ii) There is large and scalable thrust—depending on the size of plasmoid and magnetic field strength, the thrust can range at least from a tenth of a newton to tens of newtons. As the reconnecting plasmoids leave the device at the Alfven velocity, the thrust scales as magnetic field squared. (iii) The thrust does not ideally depend on ion mass, so plasma can be created from a wide range of gases, including gases extracted from asteroids. It should be noted that the reconnection process is advantageous for space propulsion, as the detachment from the magnetic field in the nozzle is not an issue here. Plasmoids are closed magnetic structures; they are detached from the moment they are created.

Unlike MPD thrusters, where the field lines diverge (resulting in arcs), here the oppositely directed field lines are forced to come together to reconnect. No other existing technology is known to have used reconnecting plasmoid ejection via helicity injection method to produce thrust. Existing space-proven plasma thrusters, including the ion thruster and the Hall-effect thruster, electrostatically accelerate ions to exhaust velocities of tens of km/s to produce thrust. However, the disclosed concept is capable of reaching high (hundreds of km/s) and variable exhaust velocities.

Thrust force: Under optimized conditions with high efficiency, very high thrust force (F=ρ [plasma mass density]×A [device cross section]×$V^2_A$ [Alfven velocity]), of a few tens of newton is anticipated. More importantly, as the reconnecting plasmoids leave the device at the Alfven velocity, thrust will scale directly with magnetic field F~$B^2$. This relationship for thrust is of great significance, and extremely timely, as this thruster: (1) can take advantage of the emerging technology of high temperature superconducting (HTS) magnets; and (2) lighter atoms such as hydrogen or deuterium can be used to produce thrust, as the thrust is only weakly dependent on plasma mass density. HTS magnet tapes can provide high magnetic field and are lighter than copper coils, which make them suitable for aerospace application, and in particular this thruster.

Advantages of the disclosed thruster include the following. (1) High and variable exhaust velocity as large as 500 km/s with injected poloidal field of 500-600 G. (2) Large and scalable thrust—depending on the size of plasmoid and magnetic field strength, the thrust can range at least from a tenth of a newton to tens of newtons. As the reconnecting plasmoids leave the device at the Alfven velocity, the thrust scales as magnetic field squared. (3) The thrust does not ideally depend on ion mass, so plasma can be created from a wide range of gases, including gases extracted from asteroids.

The disclosed approach combines the best features of the electrode-based thrusters existing plasma thrusters. By biasing the open magnetic field lines, the disclosed approach uses both voltage and magnetic flux to produce very high specific impulse. Unlike MPD thrusters, where the field lines diverge (resulting in arcs), here the oppositely directed field lines are forced to come together to reconnect. The disclosed approach, capable of reaching high and variable exhaust velocities, could complement existing designs for space exploration to Mars and beyond.

The disclosed approach starts with magnetic field lines or magnetic loops ejecting through an opening in a cylindrical vessel. The magnetic loops are produced through coils next to the opening. A voltage is applied to the gap/opening. As the field lines (and plasma) expand into the vessel, around the narrow region of the field line injection point, a thin layer of current, a current sheet, can form. If the sheet is sufficiently narrow and long, it can break. The current sheet length and width are governed by the local Lundquist number for the onset of plasmoid instability. The length of the current sheet should at least be tens of times longer than its thickness, or by the introduction of single magnetic X point. As a result, round structures similar to soap bubbles can get detached. This closing of the magnetic loops and their eventual detachment is a process known as magnetic reconnection. The spontaneous breaking of the current sheet, the so called plasmoid instability, could result in formation of many plasmoids. These plasmoids with high (Alfvenic) velocities are continuously ejected as long as a voltage is applied to the gap. The applied voltage should be about in the hundreds of volts range. Through helicity injection via the reconnection process, the whole plasma loops (plasmoids) are accelerated to produce thrust.

Steps to produce a thrust include the following:
(1) Use a cylindrical vessel.
(2) Poloidal magnetic flux need to be generated by energizing the injector flux coils. There are at least three poloidal field coils, the primary injector flux coil, and the two flux shaping coils on both sides of the primary injector flux coil. The flux shaping coils help to induce field lines near the gap to reconnect fast.
(3) Gas (argon or xenon, or deuterium/tritium/helium-3 for an advanced, fusion powered version) will be injected.
(4) A voltage is applied between the inner and outer plates, which ionizes the gas and produces current flowing along magnetic field lines.
(5) Plasma and flux are expanded in the device through J×B force.
(6) Plasmoids are formed continuously. Toroidal magnetic field is not required to form reconnecting plasmoids. Poloidal magnetic flux solely can also be used, but at larger voltage.

Figure 7A:
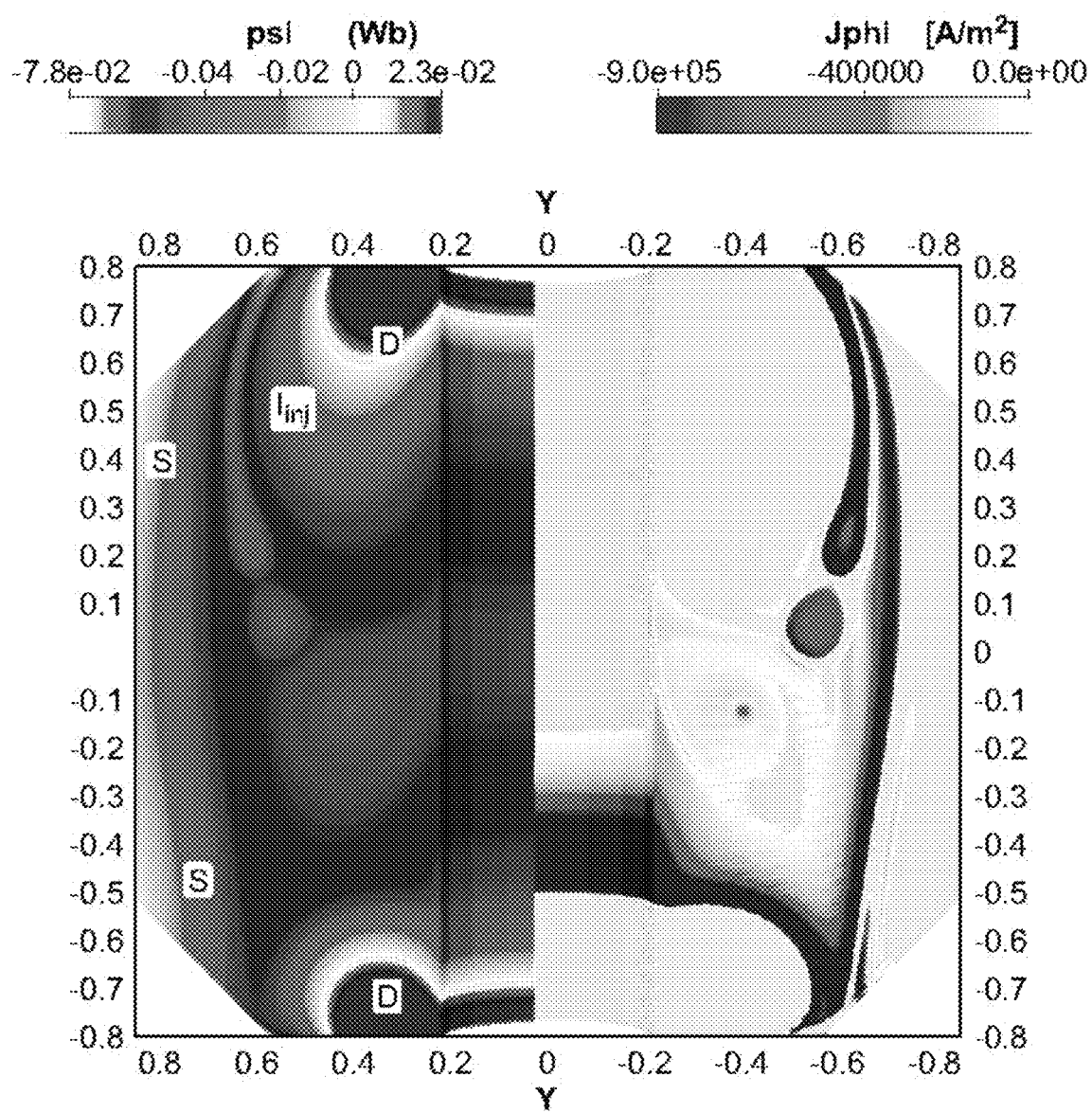
FIG. 7(a) depicts a result of MHD simulations with two injectors on the top and bottom of a toroidal chamber (with a toroidal field of about $B_\phi$=1 T, where the series of magnetic coils are used on both sides, and voltage is adjusted to first inject from the bottom and after the plasmoid is relaxed to a closed flux region, the polarity of the electric field is reversed to inject plasmoids from the top, where poloidal flux is shown on the left and current density is shown on the right according to an embodiment of the present invention.
Figure 7B:
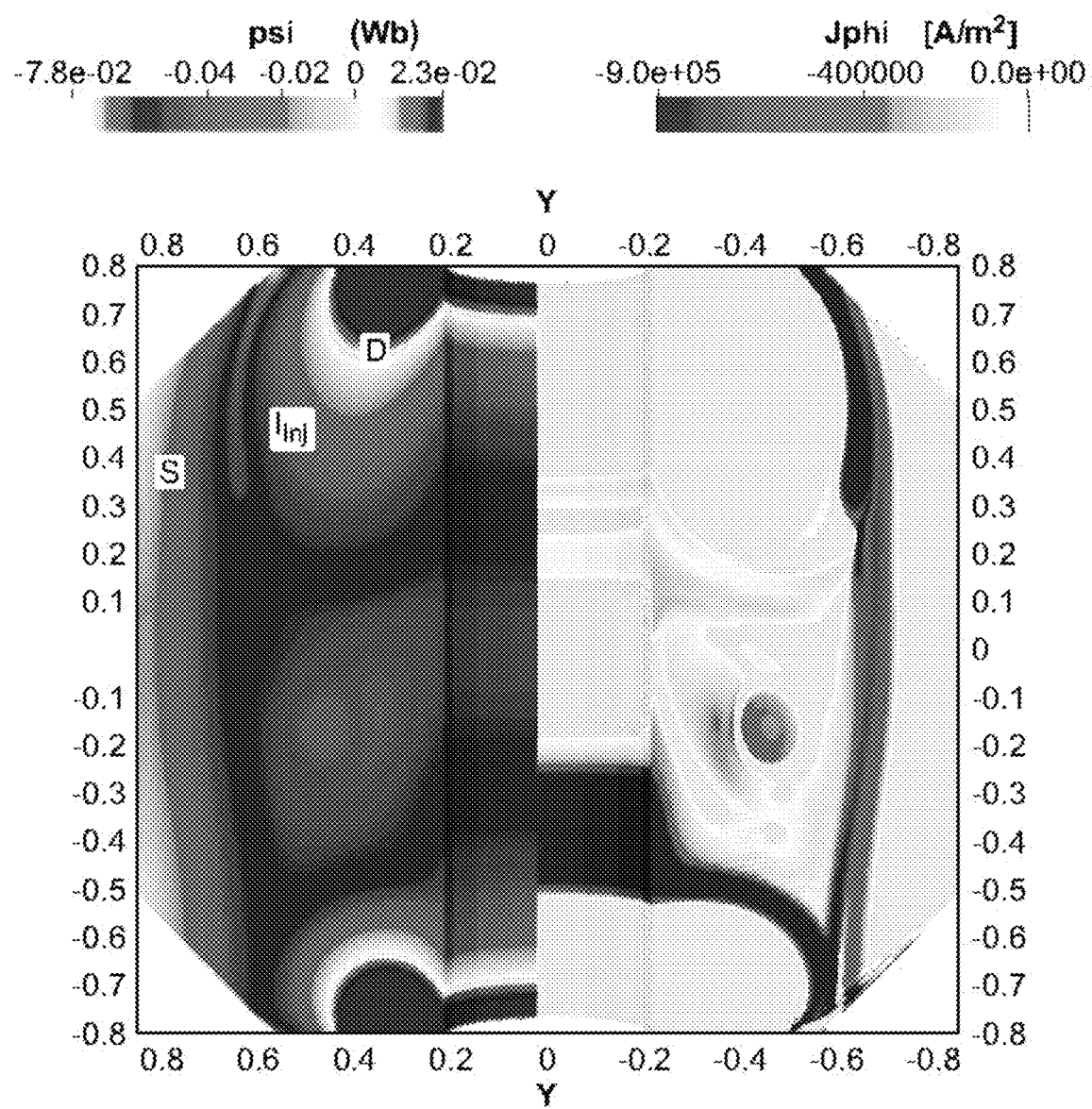
FIG. 7(b) depicts a result of MHD simulations with two injectors on the top and bottom of a toroidal chamber similar to FIG. 7(a) but at a later time when the top plasmoids are merged with the plasmoid in the bottom to generate a larger closed flux region and higher current and density appropriate for ignition according to an embodiment of the present invention.
Figure 7C:
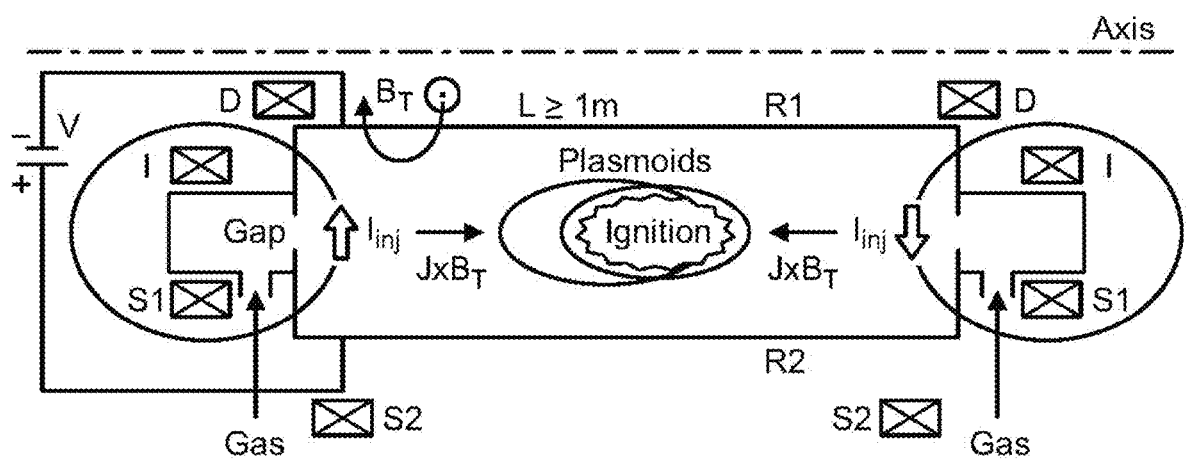
FIG. 7(c) depicts a schematic of a reconnecting plasmoids fusion approach in the presence of a toroidal magnetic field, where one plasmoid injector can be used to form spontaneous plasmoids and the voltage can be programmed to be continuously pulsed to inject more plasmoid in the plasma core for fueling, further where two injectors can be used, when one injector produces a large plasmoid, the polarity of the voltage is changed to activate the second injector (to the right in the schematic) and inject plasmoids from the right to merge with the existing plasmoids to cause ignition.

In the presence of a toroidal field, two plasmoid injectors, energized at the top and bottom of a toroidal donut-shaped chamber, would continuously inject current-carrying plasmoids through the process of fast magnetic reconnection. The generated plasmoids will continuously merge in the core to form a hot and dense axisymmetric plasma. Due to the large, generated current, ohmic ignition will take place due to continually merging of plasmoids (plasmoids are generated as the current sheet near the injector region forms and breaks into plasmoids continuously). The unique and potentially game-changing feature of the plasmoid injector is (1) the simplicity of this non-inductive current-drive technique (no RF antenna or transformer needed for heating and current-drive) and (2) the innovative magnetic configuration, which is controlled by the primary injector and shaping flux coil currents and the relative distance of these coils (and is very different from other known configurations, such as compact tori and other plasma-helicity injection gun-type experiments). FIGS. 7(a)-(c) illustrate this approach.

The reconnecting plasmoid injector fusion approach is based on an unconventional non-inductive current-drive technique, which employs the injection of current-carrying plasmoids via fast magnetic reconnection to both heat and confine the plasma for steady-state, or long-pulse, fusion-reactor operation. This new fusion approach is based on two plasmoid injectors in a toroidal vessel. In the presence of a toroidal field, two plasmoid injectors, energized at the top and bottom of a toroidal donut-shaped chamber, would continuously inject current-carrying plasmoids through the process of fast magnetic reconnection. The generated plasmoids will continuously merge in the core to form a hot axisymmetric plasma. Due to the large, generated current, ohmic ignition will take place due to continually merging of plasmoids. The new magnetic configuration avoids some complexities of conventional advanced tokamaks, such as a transformer and RF antennas.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A system for using magnetic reconnection to accelerate plasma, the system comprising:
    a pair of electrodes comprising two concentric rings separated by an electrode gap and held at different electrostatic potential by applying a voltage to generate an inter-electrode electric field;
    a plurality of magnetic coils configured to produce magnetic field lines that connect the pair of electrodes; and
    a gas injector configured to inject gas into the electrode gap, the injected gas being partially ionized by the inter-electrode electric field to generate a poloidal current that flows along open magnetic field lines across the electrode gap;
    wherein a total Lorentz force causes oppositely directed magnetic field lines to be expanded around a region of the gas injector to further create an azimuthal current in the form of an axially elongated current sheet that is unstable such that the axially elongated current sheet reconnects and breaks into plasmoids.

2. The system of claim 1, wherein plasmoids are injected periodically at the Alfven velocity in the axial direction away from the electrodes, magnetic coils, and gas injector.

3. The system of claim 2, wherein acceleration of the plasmoids is along the axially elongated current sheet.

4. The system of claim 1, wherein the electrodes are made of conducting material.

5. The system of claim 1, wherein the gas comprises at least one of argon, xenon, deuterium, tritium, and hydrogen.

6. The system of claim 1, wherein the magnetic coils are constructed of at least one of copper and high-temperature superconducting material.

7. The system of claim 1, wherein the plurality of magnetic coils comprises a primary injector flux coil and the two flux shaping coils on both sides of the primary injector flux coil.

8. The system of claim 1, wherein electric current in the magnetic coils is adjustable such that plasma exhaust velocity and thrust can be varied.

9. The system of claim 1, further comprising a cylindrical envelope closed at one end to confine the injected gas and opened at the opposite end to allow the accelerated plasma to escape and produce thrust.

10. The system of claim 1, wherein the different electrostatic potential for the pair of electrodes is static.

11. The system of claim 1, wherein the different electrostatic potential for the pair of electrodes is pulsed, allowing for magnetic reconnection to occur at Lundquist numbers below an onset threshold of plasmoid instability.

12. The system of claim 1, wherein the different electrostatic potential for the pair of electrodes is pulsed to provide timing to control exiting of the plasmoids.

13. A system for using magnetic reconnection to accelerate plasma, the system comprising:
    a pair of electrodes comprising two concentric rings separated by an electrode gap and held at different electrostatic potential by applying a voltage to generate an inter-electrode electric field;
    a plurality of magnetic coils configured to produce magnetic field lines that connect the pair of electrodes;
    a gas injector configured to inject gas into the electrode gap, the injected gas being partially ionized by the inter-electrode electric field to generate a poloidal current that flows along open magnetic field lines across the electrode gap; and
    a reaction chamber in a form of an external toroidal magnetic field;
    wherein a total Lorentz force causes oppositely directed magnetic field lines to be expanded around a region of the gas injector to further create an azimuthal current in the form of an axially elongated current sheet that is unstable such that the axially elongated current sheet reconnects and breaks into plasmoids; and
    the gas injected comprises isotopes capable of producing thermonuclear fusion reactions.

14. The system of claim 13, wherein plasmoids are injected periodically at the Alfven velocity in the axial direction away from the electrodes, magnetic coils, and gas injector.

15. The system of claim 14, wherein acceleration of the plasmoids is along the axially elongated current sheet.

16. The system of claim 13, wherein injected plasmoids are stopped in a center of the chamber by adjusting a strength and polarity of the applied voltage at the electrode gap.

17. The system of claim 13, where injected plasmoids are stopped in a center of the chamber by counter-injecting plasmoids to cancel momentum of resulting merged plasmoids.

18. The system of claim 13, wherein the electrodes are made of conducting material.

19. The system of claim 13, wherein the gas comprises at least one of deuterium, tritium, and helium-3.

20. The system of claim 13, wherein the magnetic coils are constructed of at least one of copper and high-temperature superconducting material.

21. The system of claim 13, further comprising a cylindrical envelope closed at one end to confine the injected gas and opened at the opposite end to allow the accelerated plasma to escape and produce thrust.

22. A method for using magnetic reconnection to accelerate plasma, the method comprising:
    applying a voltage to a pair of electrodes to generate an inter-electrode electric field, the pair of electrodes comprising two concentric rings separated by an electrode gap and held at different electrostatic potential;
    producing magnetic field lines that connect the pair of electrodes via a plurality of magnetic coils;
    injecting gas into the electrode gap via a gas injector, the injected gas being partially ionized by the inter-electrode electric field to generate a poloidal current that flows along open magnetic field lines across the electrode gap;
    wherein a total Lorentz force causes oppositely directed magnetic field lines to be expanded around a region of the gas injector to further create an azimuthal current in the form of an axially elongated current sheet that is unstable such that the axially elongated current sheet reconnects and breaks into plasmoids.

23. The method of claim 22, further comprising injecting plasmoids periodically at the Alfven velocity in the axial direction away from the electrodes, magnetic coils, and gas injector.

24. The method of claim 23, wherein acceleration of the plasmoids is along the axially elongated current sheet.

25. The method of claim 22, further comprising varying plasma exhaust velocity and thrust by adjusting electric current in the magnetic coils.

26. The method of claim 22, further comprising adjusting a strength and polarity of the applied voltage at the electrode gap to stop injected plasmoids in a center of a reaction chamber that is in a form of an external toroidal magnetic field.

27. The method of claim 22, further comprising counter-injecting plasmoids to cancel momentum of resulting merged plasmoids to stop injected plasmoids in a center of a reaction chamber that is in a form of an external toroidal magnetic field.

* * * * *